(12) United States Patent
Suzumura

(10) Patent No.: US 8,066,507 B2
(45) Date of Patent: Nov. 29, 2011

(54) HORIZONTAL INJECTION MOLDING MACHINE

(75) Inventor: Takeomi Suzumura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 187 days.

(21) Appl. No.: 12/670,337

(22) PCT Filed: Jul. 22, 2008

(86) PCT No.: PCT/JP2008/063476
§ 371 (c)(1),
(2), (4) Date: Jan. 22, 2010

(87) PCT Pub. No.: WO2009/014239
PCT Pub. Date: Jan. 29, 2009

(65) Prior Publication Data
US 2010/0196530 A1    Aug. 5, 2010

(30) Foreign Application Priority Data
Jul. 23, 2007    (JP) .................................. 2007-190625

(51) Int. Cl.
*B29C 45/06*    (2006.01)
(52) U.S. Cl. ........................................ 425/576; 425/134
(58) Field of Classification Search .................. 425/112, 425/134, 576
See application file for complete search history.

(56) References Cited

U.S. PATENT DOCUMENTS 4,370,124 A * 1/1983 Buja .............................. 425/576
4,652,227 A * 3/1987 Aoki ............................ 425/576

FOREIGN PATENT DOCUMENTS

| JP | 61-182914 A | 8/1986 |
| JP | 06-071690 A | 3/1994 |
| JP | 06-198528 A | 7/1994 |
| JP | 10-264200 A | 10/1998 |
| JP | 2000-84941 A | 3/2000 |
| JP | 2002-79558 A | 3/2002 |
| JP | 2007-21766 A | 2/2007 |

* cited by examiner

*Primary Examiner* — James Mackey
(74) *Attorney, Agent, or Firm* — Kenyon & Kenyon LLP

(57) ABSTRACT

A rotary plate is rotatably supported with respect to a stationary base using an R-guide, and the weight of the rotary plate and a mold mounted to the rotary plate is also supported by the R-guide in addition to a bearing. Therefore, a moment and a vertical downward load acting on the bearing of the rotary plate can be reduced. A block of the R-guide is fixed with respect to the rotary plate side through a disc spring. Therefore, while the rotary plate is rotating, the elastic force of the disc spring causes the rotary plate to separate from the stationary base by a space, which reduces the rotational resistance of the rotary plate. During mold clamping, respective pressure-receiving surfaces of the rotary plate and the stationary base contact each other against the elastic force of the disc spring, which enables reliable transfer of a mold clamping load to the stationary base.

2 Claims, 3 Drawing Sheets

HORIZONTAL INJECTION MOLDING MACHINE

This is a 371 national phase application of PCT/JP2008/063476 filed 22 Jul. 2008, claiming priority to Japanese Patent Application No. JP 2007-190625 filed 23 Jul. 2007, the contents of which are incorporated herein by reference.

TECHNICAL FIELD

The present invention relates to a horizontal injection molding machine that includes a rotary plate that has a rotary shaft extending in the horizontal direction and can be mounted with a plurality of molds; and a stationary base that is provided with bearings that support the rotary shaft of the rotary plate in a cantilever manner, and a rotary drive device of the rotary plate.

BACKGROUND ART

An injection molding machine provided with a rotary plate that can be mounted with a plurality of molds has conventionally been used as an injection molding machine for a two-color molding formed from a base material and a covering material that covers the base material. This injection molding machine performs injection molding by mounting two types of core-side molds, one for forming the base material portion and one for forming the covering material, and rotating the rotary plate with respect to a cavity-side mold to exchange the core-side molds. Accordingly, two-color molding can be achieved using one molding machine. It should be noted that a vertical injection molding machine is widely used, which is structured such that the rotary shaft of the rotary plate is oriented in the vertical direction and the mold clamping direction is the vertical direction (see Patent Documents 1 to 3, for example).

Patent Document 1: Japanese Patent Application Publication No. JP-A-S61-182914
Patent Document 2: Japanese Patent Application Publication No. JP-A-H06-198528
Patent Document 3: Japanese Patent Application Publication No. JP-A-H06-71690

DISCLOSURE OF THE INVENTION

Problem to be Solved by the Invention

Depending on the size of the molding and the scale of equipment, a horizontal injection molding machine in which the mold clamping direction is the horizontal direction and the rotary shaft of the rotary plate is provided extending in the horizontal direction may be used. In the horizontal injection molding machine, the rotary plate has a cantilever structure for reasons including facilitating mold exchange, and the bearings of the rotary plate are constantly subjected to a vertical downward load and a moment generated by the weight of the rotary plate and molds. Therefore, special high-load bearings capable of bearing the applied load must be used for supporting the rotary shaft, which requires time for procurement and increases equipment costs.

The present invention was devised in light of the foregoing problem, and it is an object of the present invention to reduce a vertical downward load and a moment acting on a bearing of a rotary plate.

Means for Solving the Problem

In order to solve the above problem, an injection molding machine according to the present invention is a horizontal injection molding machine having a rotary plate that includes a rotary shaft extending in a horizontal direction and can be mounted with a plurality of molds; and a stationary base that includes a bearing supporting the rotary shaft of the rotary plate in a cantilever manner and a rotary drive device of the rotary plate. The horizontal injection molding machine includes load receiving means that shares the weight of the rotary plate and the mold mounted to the rotary plate together with the bearing while the rotary plate is rotating, thereby reducing the load on the bearing.

Exemplary Forms of the Invention

The following forms of the invention are examples of the configuration of the present invention, and will be explained in an itemized manner to facilitate understanding of the diverse structures of the present invention. The items do not limit a technical scope of the present invention. Taking into consideration a best mode for carrying out the invention, items with some structural elements replaced, removed, or further including other structural elements can also be included in the technical scope of the invention in the present application.

(1) A horizontal injection molding machine has a rotary plate that includes a rotary shaft extending in the horizontal direction and can be mounted with a plurality of molds; and a stationary base that includes a bearing supporting the rotary shaft of the rotary plate in a cantilever manner and a rotary drive device of the rotary plate. In the horizontal injection molding machine, the rotary plate is rotatably supported with respect to the stationary base using an R-guide formed from a circular rail and a block slidably guided on the circular rail.

In the horizontal injection molding machine described in (1), by rotatably supporting the rotary plate with respect to the stationary base using the R-guide, which acts as load receiving means, a moment and a vertical downward load acting on the bearing of the rotary plate are reduced without interfering with the rotary operation of the rotary plate.

(2) In the horizontal injection molding machine according to the above (1), the block is held through a cushion.

In the horizontal injection molding machine described in (2), the block of the R-guide is held through a cushion. Therefore, the elastic force of the cushion causes the rotary plate to separate from the stationary base, which reduces the rotational resistance of the rotary plate. Thus, the moment and the vertical downward load acting on the bearing of the rotary plate are reduced without interfering with the rotary operation of the rotary plate.

(3) In the horizontal injection molding machine according to the above (1) or (2), respective opposing portions of the rotary plate and the stationary base are formed with pressure-receiving surfaces that receive a mold clamping load (claim 1). In the horizontal injection molding machine described in (3), during mold clamping, the pressure-receiving surfaces of the rotary plate and the stationary base contact each other against the elastic force of the disc spring, which enables reliable transfer of a mold clamping load to the stationary base.

(4) In the horizontal injection molding machine, the rotary plate has a disc shape, and the circular rail of the R-guide is provided along the vicinity of an outer peripheral end of the rotary plate. In the horizontal injection molding machine described in (4), the weight of the rotary plate and the mold mounted to the rotary plate is supported by the bearing as well as the R-guide provided along the vicinity of the outer peripheral end of the rotary plate. Therefore, the moment acting on the bearing of the rotary plate is efficiently reduced without interfering with the rotary operation of the rotary plate.

(5) In the horizontal injection molding machine, the circular rail of the R-guide is fixed to the stationary base side, and the block of the R-guide is fixed to the rotary plate side through the disc spring that acts as the cushion (claim 3).

In the horizontal injection molding machine described in (5), the block slidably guided on the circular rail, which is fixed to the stationary base side, is fixed with respect to the rotary plate side through the disc spring. Therefore, while the rotary plate is rotating, the elastic force of the disc spring causes the rotary plate to separate from the stationary base, which reduces the rotational resistance of the rotary plate. Thus, the moment acting on the bearing of the rotary plate is efficiently reduced without interfering with the rotary operation of the rotary plate. Meanwhile, during mold clamping, the rotary plate contacts the stationary base against the elastic force of the disc spring, which enables reliable transfer of the mold clamping load to the stationary base.

Effects of the Invention

The present invention is configured as described above. Thus, in the horizontal injection molding machine, it is possible to reduce the moment and the vertical downward load acting on the bearing of the rotary plate.

BRIEF DESCRIPTION OF THE DRAWINGS

FIGS. 1(a) and 1(b) show schematic diagrams of a horizontal injection molding machine according to an embodiment of the present invention, wherein FIG. 1(a) is a vertical cross-sectional view of a rotary plate and a stationary base, and FIG. 1(b) is a frontal view of the rotary plate and the stationary base.

FIGS. 3(a) and 3(b) show cross-sectional views of an essential portion of the horizontal injection molding machine according to the embodiment of the present invention, wherein FIG. 3(a) shows the appearance of the rotary plate during rotation, and FIG. 3(b) shows the appearance of the rotary plate during mold clamping.

DESCRIPTION OF THE REFERENCE NUMERALS

10 HORIZONTAL INJECTION MOLDING MACHINE
12 MOLD
14 ROTARY PLATE
16 ROTARY SHAFT
18 BEARING
20 ROTARY DRIVE DEVICE
22 STATIONARY BASE
24 CIRCULAR RAIL
26 BLOCK
28 R-GUIDE
30 CUSHION

BEST MODE FOR CARRYING OUT THE INVENTION

A best mode for carrying out the present invention will be described below with reference to the attached drawings.

Figure 1B:
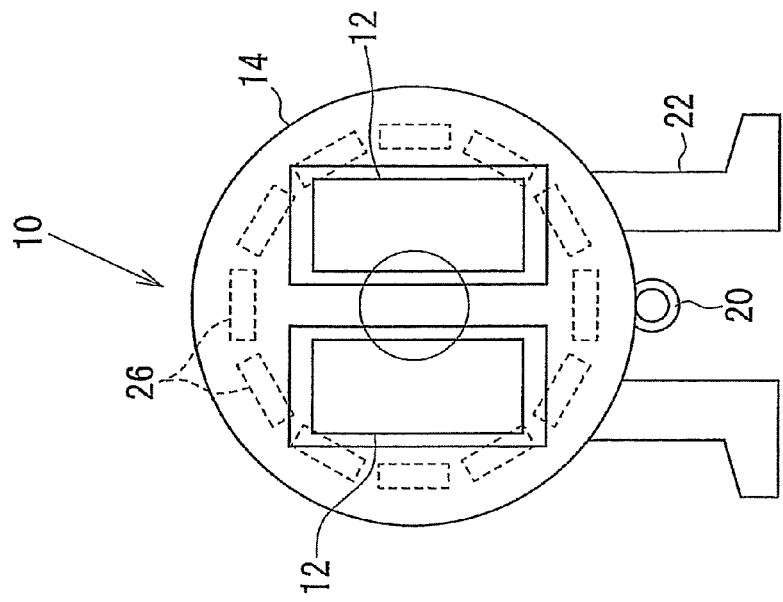
Figure 1A:
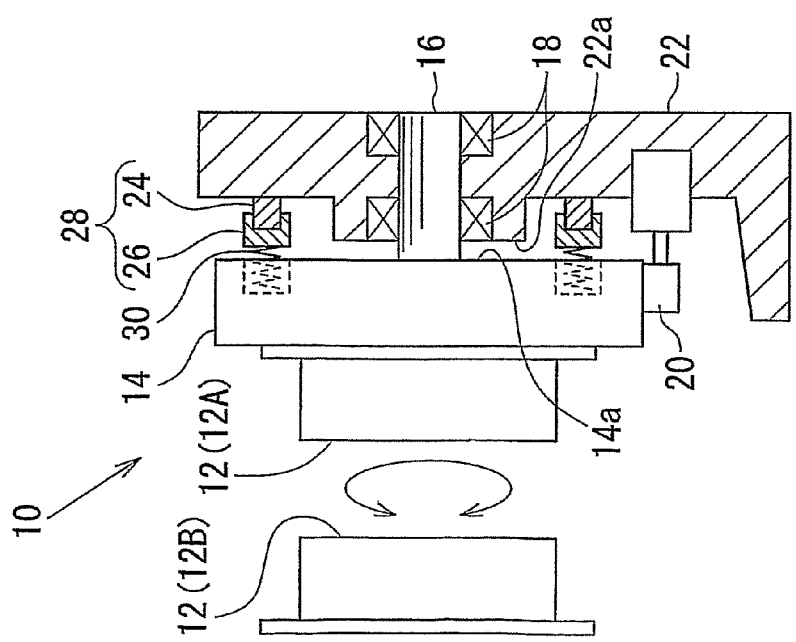

As shown in FIG. 1, a horizontal injection molding machine according to an embodiment of the present invention includes: a disc shaped rotary plate 14 that is provided with a rotary shaft 16 extending in the horizontal direction, and can be mounted with a plurality of molds 12; and a stationary base 22 that is provided with a bearing 18 that supports the rotary shaft 16 of the rotary plate 14 in a cantilever manner, and a rotary drive device of the rotary plate 14. Here, the rotary drive device 20 transmits the driving force of a motor to the rotary shaft 14 through a reducer such as a gear or the like, and can index the rotation angle of the rotary plate 14 with respect to the stationary base 22 with high precision.

An R-guide 28, which is formed from a circular rail 24 and a block 26 that is slidably guided on the circular rail 24, rotatably supports the rotary shaft 14 with respect to the stationary base 22, and the block 26 is held through a cushion 30. The circular rail 24 of the R-guide 28 is provided following as near the outer peripheral end of the rotary plate 14 as possible. Respective opposing portions of the rotary plate 14 and the stationary base 22 are formed with pressure-receiving surfaces 14a, 22a for receiving a mold clamping load. Note that reference numerals 12A, 12B indicates a core-side mold and a cavity-side mold, respectively.

Figure 2:
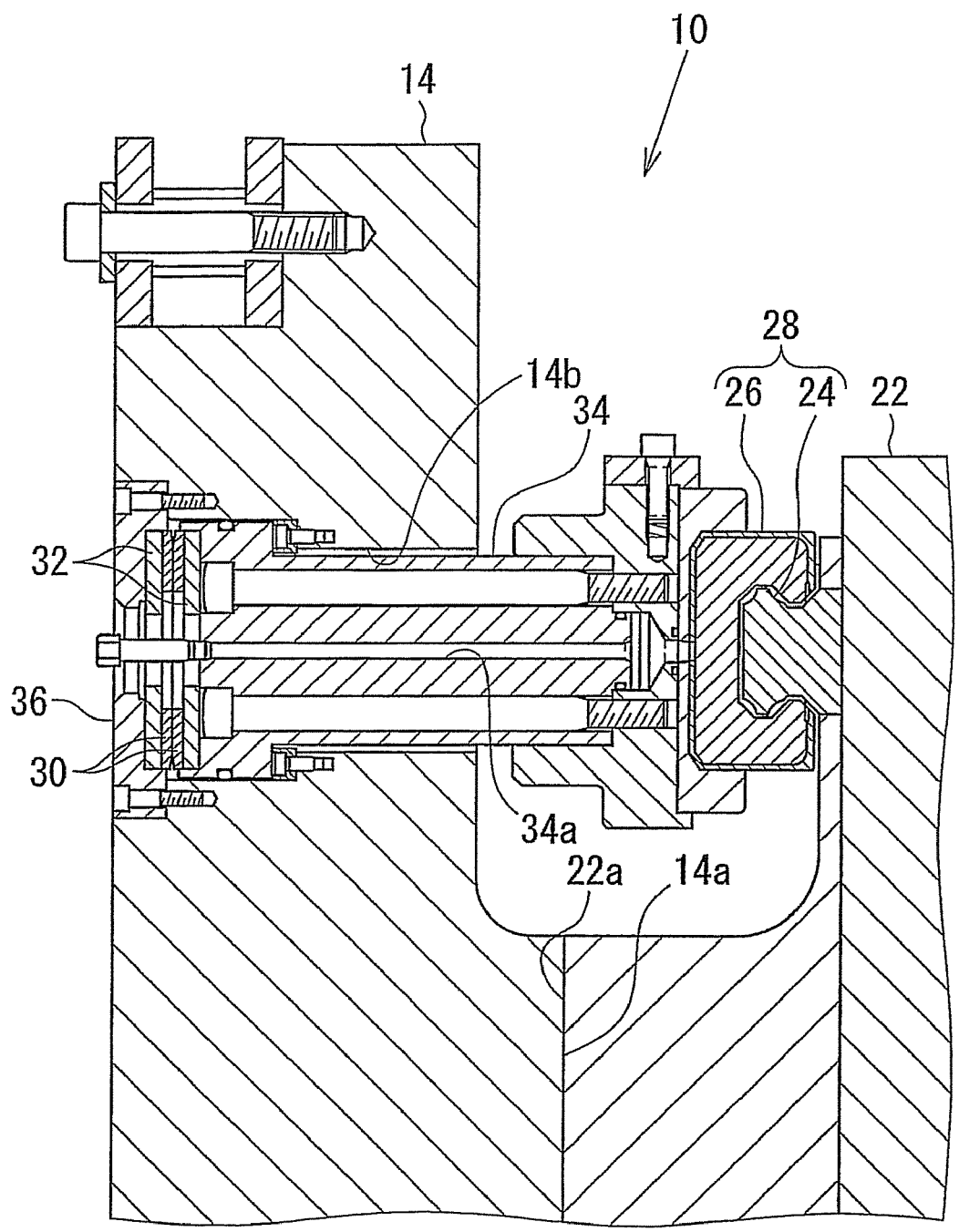
FIG. 2 is a vertical cross-sectional view that shows the structure of surrounding portions of an R-guide and a cushion of the horizontal injection molding machine shown in FIG. 1.

FIG. 2 shows the structure of surrounding portions of the R-guide 28 and the cushion 30 in more detail. The circular rail 24 of the R-guide 28 is fixed to the stationary base 22 side, and the block 26 is fixed to the rotary plate 14 side through a disc spring 30 serving as the cushion. Regarding the disc spring 30 here, two springs are opposingly overlapped, and interposed between two washers 32 and further disposed between a block holder 34 accommodated in a through hole 14b of the rotary plate and a cap 36. Removing the cap 36 enables easy maintenance and replacement of the disc spring 30. In addition, the block holder 34 is formed with a lubrication hole 34a for lubricating the block 26. Note that the block 26 and a support structure thereof shown in FIG. 2 are provided in a plurality at regular intervals on the same circumference (along the circular rail 24), as illustrated in FIG. 1(b).

Figure 3A:
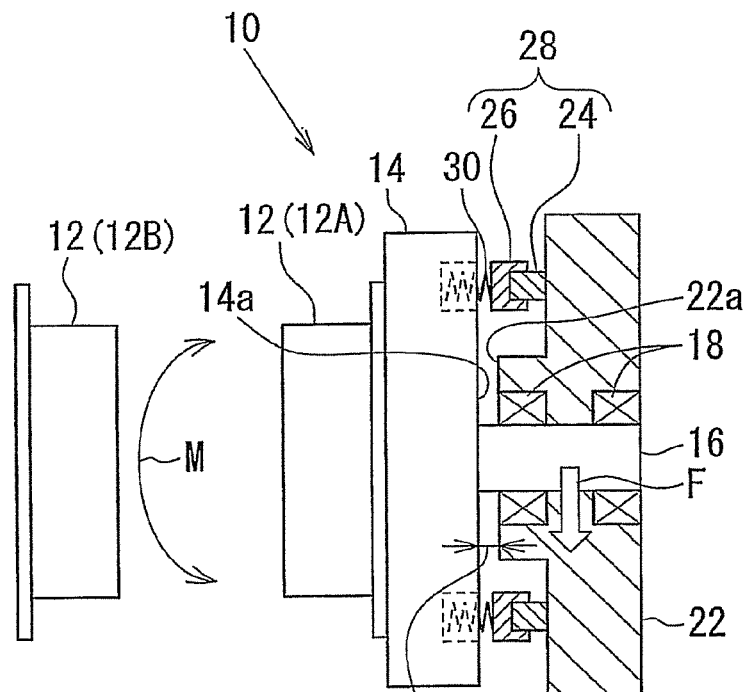

The horizontal injection molding machine 10 according to the embodiment of the present invention with the above constitution can obtain the following operation and effects. By rotatably supporting the rotary plate 14 with respect to the stationary base 22 using the R-guide 28, which acts as load receiving means, a structure is achieved in which the weight of the rotary plate 14 and the mold 12 mounted to the rotary plate 14 is supported by the R-guide 28 in addition to the rotary shaft 16 and the bearing 18. Therefore, as shown in FIG. 3(a), a moment M and a vertical downward load F acting on the bearing 18 of the rotary plate can be reduced without interfering with the rotary operation of the rotary plate 14.

In addition, providing the R-guide 28 along the vicinity of the outer peripheral end of the rotary plate 14 makes it possible to efficiently reduce generation of the moment acting on the bearing 18 of the rotary plate 14.

The block 26 slidably guided on the circular rail 24, which is fixed to the stationary base 22 side, is fixed with respect to the rotary plate 14 side through the disc spring 30. Therefore, while the rotary plate 14 is rotating (including when the rotary plate 14 is stopped for other than mold clamping), the elastic force of the disc spring 30 causes the rotary plate 14 to separate from the stationary base 22 by a space S shown in FIG. 3(a), which reduces the rotational resistance of the rotary plate. The space S may be any distance provided that the space secured ensures that the rotary plate 14 does not contact the stationary base 22, for example, the space S may be set to approximately 0.5 millimeters. Accordingly, the moment M and the vertical downward load F acting on the bearing 18 of the rotary plate 14 can be reduced without interfering with the rotary operation of the rotary plate 14.

Figure 3B:
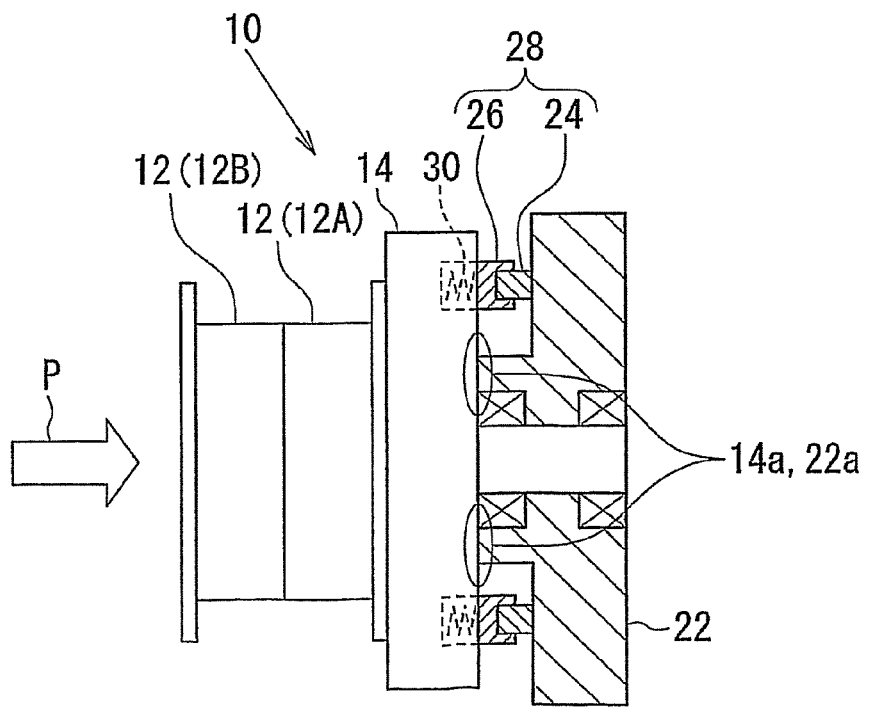

During mold clamping, as shown in FIG. 3(b), the pressure-receiving surfaces 14a, 22a of the rotary plate and the stationary base contact each other against the elastic force of the disc spring 30, which enables reliable transfer of a mold clamping load P to the stationary base 22. There is thus no risk of an insufficient mold clamping force. Note that instead of the disc spring 30, another cushion capable of receiving the required load may also be used.

As described above, according to the embodiment of the present invention, the moment M and the vertical downward load F acting on the bearing 18 of the rotary plate 14 can be reduced while using a common bearing to support the rotary shaft 16 of the rotary plate 14. There is thus no need to procure special high-load bearings, and the horizontal injection molding machine 10 can be provided without increasing equipment costs.

The invention claimed is:

1. A horizontal injection molding machine, comprising: a rotary plate that includes a rotary shaft extending in a horizontal direction and can be mounted with a plurality of molds; and a stationary base that includes a bearing supporting the rotary shaft of the rotary plate in a cantilever manner and a rotary drive device of the rotary plate, the horizontal injection molding machine characterized in that the rotary plate is formed into a disk shape and is rotatably supported by the stationary base by means of an R-guide as a load receiving means that is composed of a circular rail and a block slidably guided on the circular rail, the circular rail of the R-guide, which is provided between the rotary plate and the stationary base and arranged along the vicinity of an outer periphery of the rotary plate, is fixed to the stationary base side, and the block of the R-guide is fixed to the rotary plate side through a disk spring as a cushion, and respective opposing portions of the rotary plate and the stationary base are formed with pressure-receiving surfaces that receive a mold clamping load.

2. The horizontal injection molding machine according to claim 1, characterized in that said block comprises a plurality of blocks provided on the same circumference along the circular rail, and each of the plurality of blocks is arranged at regular intervals all around the circular rail.

* * * * *